(12) United States Patent
Imai

(10) Patent No.: US 12,729,770 B2
(45) Date of Patent: Sep. 8, 2026

(54) FLUID DEVICE

(71) Applicant: Surpass Industry Co., Ltd., Gyoda (JP)

(72) Inventor: Hiroshi Imai, Gyoda (JP)

(73) Assignee: Surpass Industry Co., Ltd., Gyoda (JP)

( * ) Notice: Subject to any disclaimer, the term of this patent is extended or adjusted under 35 U.S.C. 154(b) by 0 days.

(21) Appl. No.: 19/179,139

(22) Filed: Apr. 15, 2025

(65) Prior Publication Data

US 2026/0160343 A1 Jun. 11, 2026

(30) Foreign Application Priority Data

Apr. 18, 2024 (JP) ................................ 2024-067565
Oct. 30, 2024 (JP) ................................ 2024-190945

(51) Int. Cl.

| | |
|---|---|
| ***F16K 7/12*** | (2006.01) |
| ***F16K 7/17*** | (2006.01) |
| ***F16K 25/00*** | (2006.01) |
| ***F16K 27/02*** | (2006.01) |
| ***F16K 31/122*** | (2006.01) |
| ***H05F 3/02*** | (2006.01) |

(52) U.S. Cl.

CPC .................. *F16K 7/12* (2013.01); *F16K 7/17* (2013.01); *F16K 25/005* (2013.01); *F16K 27/02* (2013.01); *F16K 27/0236* (2013.01); *F16K 31/122* (2013.01); *F16K 31/1221* (2013.01); *H05F 3/02* (2013.01)

(58) Field of Classification Search

CPC . F16K 7/12; F16K 7/17; F16K 25/005; F16K 27/02; F16K 27/0236; F16K 31/122; F16K 31/1221; H05F 3/02

See application file for complete search history.

(56) References Cited

U.S. PATENT DOCUMENTS

| | | | |
|---|---|---|---|
| 9,995,415 B2 * | 6/2018 | Imai | F16K 31/1266 |
| 2015/0129791 A1 * | 5/2015 | Okita | F16K 7/14 251/331 |
| 2018/0038505 A1 | 2/2018 | Imai et al. | |
| 2022/0163137 A1 * | 5/2022 | Ebihara | F16K 27/0236 |

FOREIGN PATENT DOCUMENTS

| | | |
|---|---|---|
| JP | 6106794 B1 | 4/2017 |

* cited by examiner

*Primary Examiner* — John Bastianelli

(74) *Attorney, Agent, or Firm* — DINSMORE & SHOHL LLP

(57) ABSTRACT

An isolation valve including: a valve unit movable along an axis; a body inside which a valve hole and a valve chamber allowing a fluid to flow therethrough are formed; a diaphragm unit having a thin film part formed annularly about the axis to isolate the valve chamber from an adjacent space and a base part connected on the outer circumferential side of the thin film part; a static charge eliminating unit arranged interposed between the body and the base part in a direction along the axis; and an electrical conduction part contacted with the static charge eliminating unit and maintained at a ground potential, and the static charge eliminating unit has an exposed part formed of an electroconductive fluororesin material, which contains a fluororesin material and an electroconductive material dispersed in the fluororesin material, and exposed to the valve chamber.

11 Claims, 8 Drawing Sheets

FIG. 8

FLUID DEVICE

CROSS-REFERENCE TO RELATED APPLICATIONS

This application claims priority to Japanese Patent Application No. 2024-067565 filed on Apr. 18, 2024 and Japanese Patent Application No. 2024-190945 filed on Oct. 30, 2024, the entire contents of which are herein incorporated by reference.

BACKGROUND

1. Technical Field

The present disclosure relates to a fluid device.

2. Description of Related Art

Fluororesin materials have excellent chemical resistance or contamination resistance and thus are widely used in fluid devices that allow corrosive fluids, pure water, or the like used in semiconductor manufacturing to flow. Further, fluid devices in which a thin-film diaphragm unit that separates a fluid channel and an adjacent space adjacent thereto from each other is connected to a valve unit are known as a fluid device that adjusts the position of a valve unit moving closer to or away from a valve hole to adjust the flow rate of a fluid flowing through a fluid channel.

In a fluid device having a diaphragm unit formed of a fluororesin material, when static electricity occurs therein due to friction between a fluid channel and a fluid, the fluororesin material forming the thin-film diaphragm unit may reach a dielectric breakdown, and a malfunction may occur that a fluid flowing through the fluid channel flows out of the diaphragm unit.

Japanese U.S. Pat. No. 6,106,794 discloses that the diaphragm unit is formed of an electroconductive fluororesin material, the diaphragm unit is maintained at a ground potential, and this prevents the diaphragm unit from reaching a dielectric breakdown.

In the fluid device disclosed in Japanese U.S. Pat. No. 6,106,794, however, since the diaphragm unit and the valve unit connected to the diaphragm unit are entirely formed of an electroconductive fluororesin material, manufacturing costs would increase. Further, even though the ratio of carbon nanotubes contained in the electroconductive fluororesin material is adjusted to suppress contamination of the fluid in contact with the diaphragm unit, the contact area of the fluid with respect to the diaphragm unit and the valve unit is large. Thus, it may not be possible to completely prevent contamination of the fluid due to dissolution of metal ions from carbon nanotubes.

BRIEF SUMMARY

The present disclosure has been made in view of such circumstances and intends to provide a fluid device that suppresses a malfunction that a thin-film diaphragm unit reaches a dielectric breakdown and a fluid flowing through the fluid channel flows out of the diaphragm unit.

The present disclosure employs the following solutions in order to solve the above problem.

A fluid device according to one aspect of the present disclosure includes: a valve unit formed axially extending along an axis and configured to be movable along the axis; a body having a valve hole and a fluid channel formed inside the body, the valve unit moving closer to or away from the valve hole, and a fluid being allowed to flow through the fluid channel; a diaphragm unit having a thin film part and a base part, the thin film part being connected to an outer circumferential face of the valve unit and formed annularly about the axis so as to isolate a valve chamber from an adjacent space adjacent to the valve chamber, the valve unit being arranged in the valve chamber, and the base part being connected on the outer circumferential side of the thin film part and formed annularly about the axis; a static charge eliminating unit formed annularly about the axis and arranged interposed between the body and the base part in a direction along the axis; and an electrical conduction part being in contact with the static charge eliminating unit and being maintained at a ground potential, and the static charge eliminating unit is formed of an electroconductive fluororesin material containing a fluororesin material and an electroconductive material dispersed in the fluororesin material and forms a part of the valve chamber.

According to the fluid device according to one aspect of the present disclosure, the static charge eliminating unit formed of an electroconductive fluororesin material is arranged interposed between the body, inside which the fluid channel is formed, and the base part of the diaphragm unit connected to the outer circumferential face of the valve unit. Positive electrical charge generated in a fluid due to friction between the diaphragm unit and a fluid is eliminated through the exposed part of the static charge eliminating unit maintained at the ground potential by the electrical conduction part, and accordingly, negative electrical charge in the diaphragm unit is eliminated. It is thus possible to suppress a malfunction that the thin-film diaphragm unit reaches a dielectric breakdown and a fluid flowing through the fluid channel flows out of the diaphragm unit. Further, compared to a case where the diaphragm unit and the valve unit are entirely formed of an electroconductive fluororesin material, the contact area between the electroconductive fluororesin material and a fluid can be reduced, and contamination of the fluid due to dissolution of metal ions from the electroconductive fluororesin material can be prevented.

In the fluid device according to one aspect of the present disclosure, a preferable configuration is such that the static charge eliminating unit has an accommodation part configured to accommodate the base part on the inner circumferential side in a radial direction orthogonal to the direction along the axis, and the base part and the static charge eliminating unit are arranged with an outer circumferential face of the base part being in contact with an inner circumferential face of the accommodation part.

According to the fluid device of the above configuration, since the outer circumferential face of the base part and the inner circumferential face of the accommodation part are arranged in contact with each other, a change in the position in the radial direction of the base part can be reliably prevented that would otherwise be caused by the base part moving outward in the radial direction.

In the fluid device of the above configuration, a preferable mode is such that a first annular protrusion protruding toward the static charge eliminating unit and formed annularly about the axis is formed on an outer edge in the radial direction of the base part, a first annular groove formed annularly about the axis is formed in a region of the static charge eliminating unit, the region facing the first annular protrusion, and the base part and the static charge eliminating unit are arranged with the first annular protrusion being inserted in the first annular groove.

According to the fluid device of the above mode, the first annular protrusion formed on the outer edge in the radial direction of the base part is arranged inserted in the first annular groove formed in the static charge eliminating unit, and the seal region is formed to the entire circumference about the axis. This seal region makes it possible to reliably prevent a fluid from flowing out from between the base part and the static charge eliminating unit.

In the fluid device of the above mode, a form may be such that the exposed part is exposed to the valve chamber in a predetermined region in the direction along the axis, and the predetermined region is included in a seal region where the first annular protrusion and the first annular groove are arranged in the direction along the axis.

According to the fluid device of the above form, the exposed part of the static charge eliminating unit is exposed to the valve chamber in the predetermined region included in the seal region in which the first annular protrusion and the first annular groove are arranged in the direction along the axis. Since the exposed part is present near the thin film part of the diaphragm unit, charges on the thin film part and a fluid, which is positively charged due to friction with the thin film part, can be reliably eliminated.

In the fluid device of the above form, the length of the predetermined region in the direction along the axis may be shorter than the length of the seal region in the direction along the axis. Because the length of the predetermined region in the direction along the axis is shorter than the length of the seal region, the area of the exposed part can be reduced, and contamination of the fluid can be reliably prevented that would otherwise be caused by dissolution of metal ions from the electroconductive fluororesin material.

In the fluid device of the above configuration, a preferable mode is such that a second annular protrusion protruding toward the body and formed annularly about the axis is formed to the static charge eliminating unit, a second annular groove formed annularly about the axis is formed in a region of the body, the region facing the second annular protrusion, and the static charge eliminating unit and the body are arranged with the second annular protrusion being inserted in the second annular groove.

According to the fluid device of the above mode, the second annular protrusion formed to the static charge eliminating unit is arranged inserted in the second annular groove formed in the body, and a seal region is formed to the entire circumference about the axis. This seal region makes it possible to reliably prevent a fluid from flowing out from between the static charge eliminating unit and the body.

In the fluid device of the above mode, a preferable form is such that the first annular protrusion, the first annular groove, the second annular protrusion, and the second annular groove are arranged at the same position in the radial direction.

According to the fluid device of the above form, since a load applied from the first annular protrusion to the first annular groove is transferred from the second annular protrusion to the second annular groove, the seal property of the seal region formed by the second annular protrusion and the second annular groove can be improved.

In the fluid device of the above configuration, a preferable mode is such that a second annular protrusion protruding toward the static charge eliminating unit and formed annularly about the axis is formed to the body, a second annular groove formed annularly about the axis is formed in a region of the static charge eliminating unit, the region facing the second annular protrusion, and the body and the static charge eliminating unit are arranged with the second annular protrusion being inserted in the second annular groove.

According to the fluid device of the above mode, the second annular protrusion formed to the body is arranged inserted in the second annular groove formed in the static charge eliminating unit, and a seal region is formed to the entire circumference about the axis. This seal region makes it possible to reliably prevent a fluid from flowing out from between the static charge eliminating unit and the body.

In the fluid device of the above mode, a preferable form is such that the first annular protrusion, the first annular groove, the second annular protrusion, and the second annular groove are arranged at the same position in the radial direction.

According to the fluid device of the above form, since a load applied from the first annular protrusion to the first annular groove is transferred from the second annular groove to the second annular protrusion, the seal property of the seal region formed by the second annular protrusion and the second annular groove can be improved.

In the fluid device according to one aspect of the present disclosure, a preferable configuration is such that the electrical conduction part is an electrical wire having a metal conductor and an insulator covering the conductor, the conductor being maintained at a ground potential and formed in a line shape, an accommodation face arranged annularly about the axis in contact with an outer circumferential face of the static charge eliminating unit is formed in the body, a groove extending along the axis is formed in the accommodation face, and the conductor exposed at a tip of the electrical conduction part is accommodated in the groove in electrical conduction with the static charge eliminating unit.

According to the fluid device of the above configuration, an electrical wire having the conductor and the insulator covering the conductor is formed as the electrical conduction part, the conductor exposed at the tip of the electrical conduction part is accommodated in the groove formed in the accommodation face of the body, and thereby the static charge eliminating unit can be maintained at the ground potential with a relatively simple manner.

In the fluid device of the above configuration, a preferable mode is such that the conductor exposed at the tip of the electrical conduction part is fixed to the groove by an adhesive agent containing an electroconductive material.

According to the fluid device of the above mode, the adhesive agent containing an electroconductive material is injected into and solidified in the groove in a state where the conductor exposed at the tip of the electrical conduction part is accommodated in the groove, and thereby the conductor can be reliably fixed to the groove while the conductor is maintained in electrical connection to the static charge eliminating unit.

According to the present disclosure, it is possible to provide a fluid device that suppresses a malfunction that a thin-film diaphragm unit reaches a dielectric breakdown and a fluid flowing through the fluid channel flows out of the diaphragm unit.

BRIEF DESCRIPTION OF THE SEVERAL VIEWS OF THE DRAWINGS

FIG. 8 is a plan view of the isolation valve illustrated in FIG. 7 when viewed from above with an upper housing being detached.

DETAILED DESCRIPTION

First Embodiment

Figure 1:
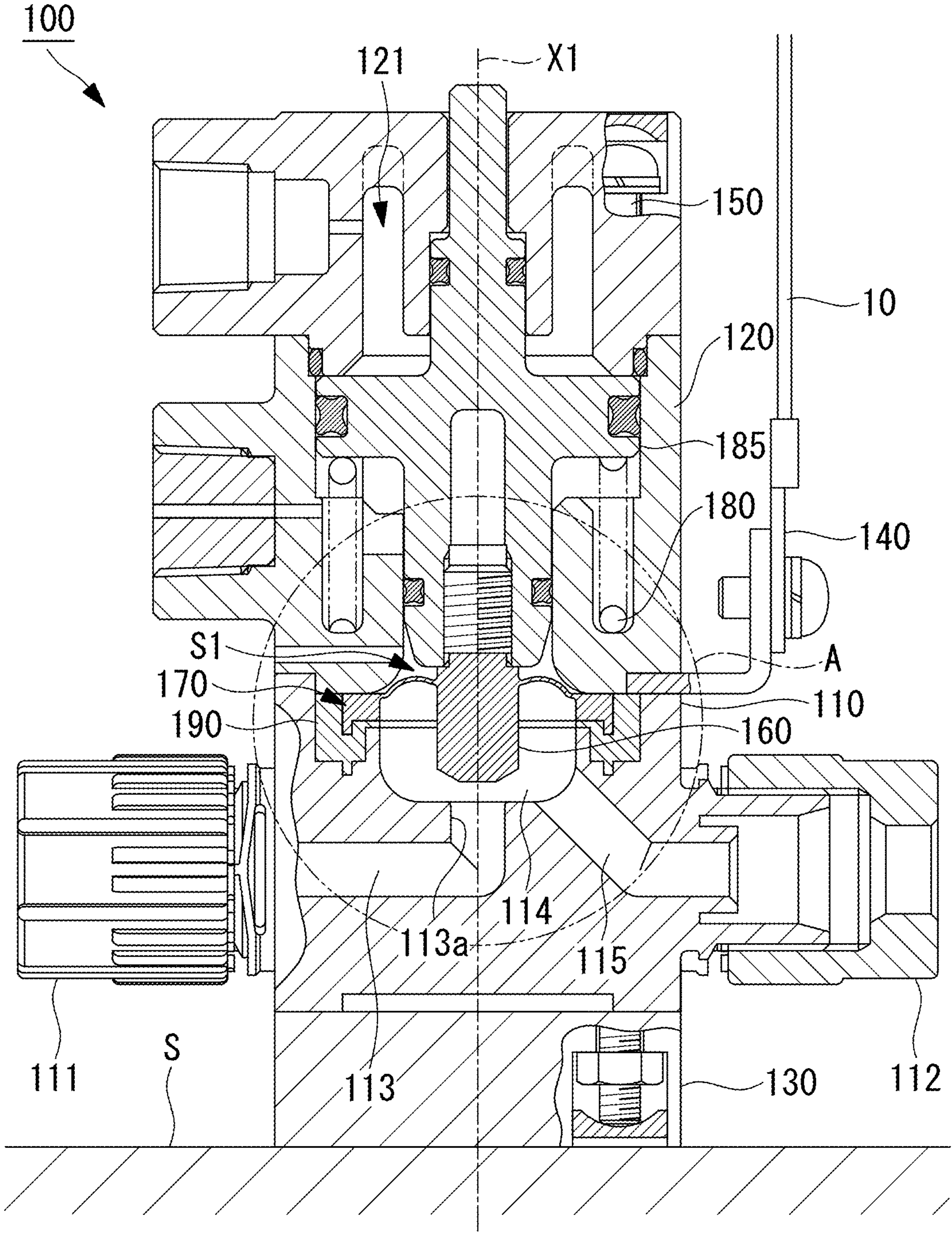
FIG. 1 is a longitudinal sectional view illustrating an isolation valve according to a first embodiment of the present disclosure.
Figure 2:
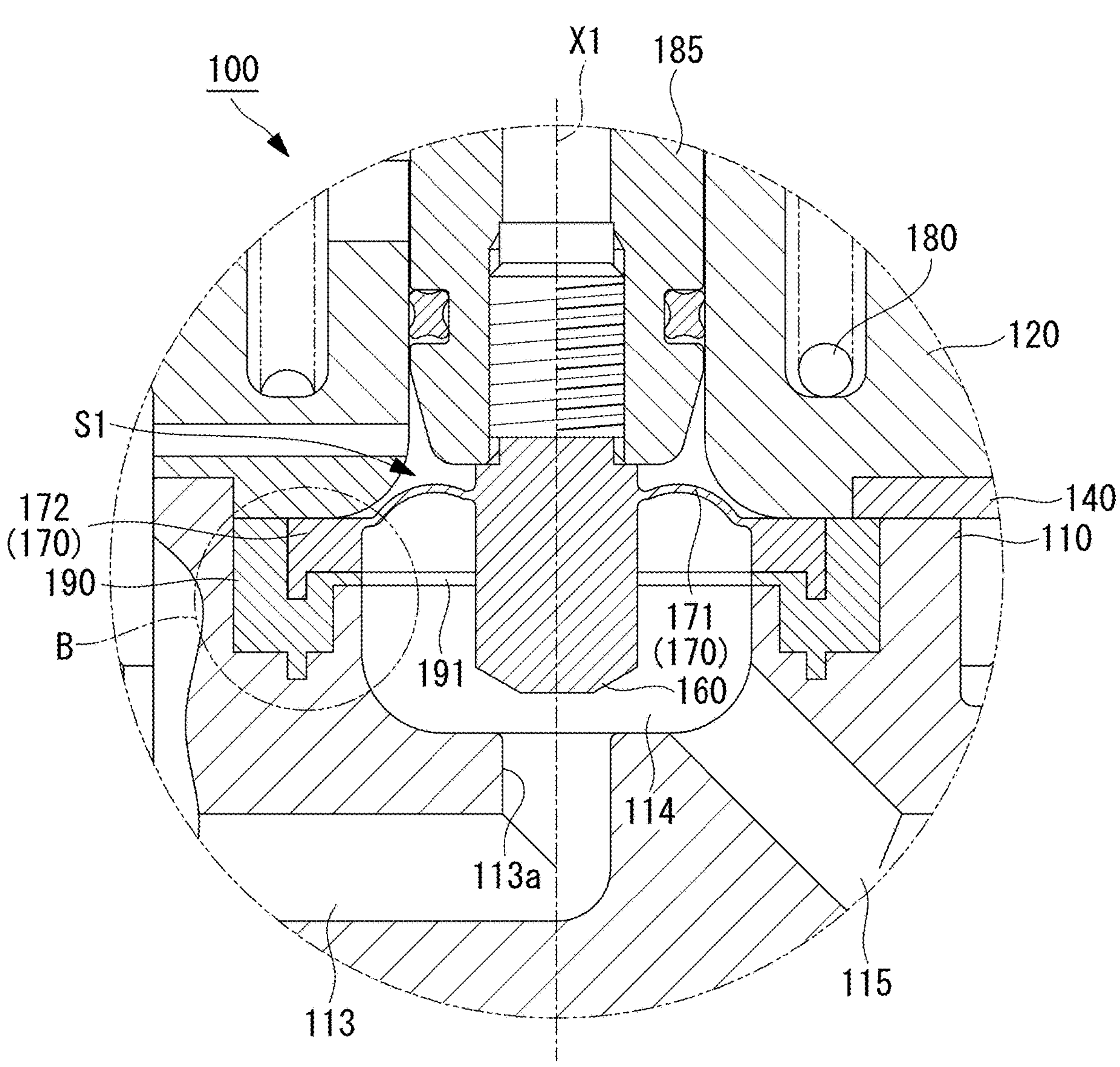
FIG. 2 is a partial enlarged view of a part A of the isolation valve illustrated in FIG. 1.

An isolation valve (fluid device) 100 of a first embodiment of the present disclosure will be described below with reference to the drawings. The isolation valve 100 of the present embodiment is a fluid device installed in a pipe that allows a fluid used in a semiconductor manufacturing device or the like (a liquid such as a chemical liquid or pure water) to flow therethrough. FIG. 1 is a longitudinal sectional view illustrating the isolation valve 100 according to the first embodiment of the present disclosure. FIG. 2 is a partial enlarged view of the part A of the isolation valve 100 illustrated in FIG. 1.

As illustrated in FIG. 1 and FIG. 2, the isolation valve 100 includes a body 110, an upper housing 120, a lower housing 130, an electrical conduction part 140, fastening bolts 150, a valve unit 160, a diaphragm unit 170, a spring 180, and a static charge eliminating unit 190.

The body 110 is a member inside which a fluid channel (an inflow-side channel 113, a valve chamber 114, and an outflow-side channel 115 described later) that guides a fluid from an inflow port 111 to an outflow port 112 is formed. The body 110 is formed of a fluororesin material.

The fluid channel formed inside the body 110 has the inflow-side channel 113, the valve chamber 114, and the outflow-side channel 115. A fluid that has flown into the inflow-side channel 113 is guided to the valve chamber 114, and the fluid guided to the valve chamber 114 is guided to the outflow-side channel 115. A valve hole 113*a* to or from which the valve unit 160 moves closer or away along the axis X1 is formed at the end on the valve chamber 114 side of the inflow-side channel 113.

The upper housing 120 is a member that is arranged above the body 110 and accommodates the diaphragm unit 170 and the static charge eliminating unit 190 in a space formed between the body 110 and the upper housing 120. The lower housing 130 is a member arranged below the body 110 and installed to an installation face S.

As illustrated in FIG. 1, the upper housing 120 and the lower housing 130 are fastened by the fastening bolts 150 with the body 110 being interposed therebetween, and thereby the body 110, the upper housing 120, and the lower housing 130 are integrated. The upper housing 120 and the lower housing 130 are integrated by, for example, four fastening bolts 150 arranged at the same distance from the axis X1.

The electrical conduction part 140 is a metal member arranged interposed between the body 110 and the upper housing 120 in the direction along the axis X1. The electrical conduction part 140 is attached in contact with the static charge eliminating unit 190. The electrical conduction part 140 is connected to a grounding cable 10, which is maintained at a ground potential, and maintained at the ground potential.

As illustrated in FIG. 1 and FIG. 2, the valve unit 160 is a member formed axially along the axis X1 and configured to move closer to or away from the valve hole 113*a* that guides a fluid from the inflow-side channel 113 to the valve chamber 114. The valve unit 160 is movable along the axis X1 by counter force generated by a pressure chamber 121 described later.

The isolation valve 100 can be switched between a closed state where the valve unit 160 has been moved to come closer to and then into contact with the body 110 to block inflow of a fluid from the valve hole 113*a* to the valve chamber 114 and an open state where the valve unit 160 has been moved away from the body 110 as illustrated in FIG. 1 and FIG. 2. The valve chamber 114 is a space in which the valve unit 160 is arranged, through which the inflow-side channel 113 and the outflow-side channel 115 are allowed to communicate with each other, and which is formed between the body 110 and the bottom face of the diaphragm unit 170.

As illustrated in FIG. 2, the diaphragm unit 170 is a member having a thin film part 171 and a base part 172. The thin film part 171 is connected to the outer circumferential face of the valve unit 160 arranged in the valve chamber 114 and is formed annularly about the axis X1 so as to isolate the valve chamber 114 including the valve unit 160 arranged therein from an adjacent space S1 adjacent to the valve chamber 114. The base part 172 is connected to the outer circumferential side of the thin film part 171 and formed annularly about the axis X1.

The diaphragm unit 170 is formed of a fluororesin material integrally with the valve unit 160. The thin film part 171 is formed annularly about the axis X1 and formed in a thin-film shape with a thickness of 0.2 mm to 0.5 mm. The thin film part 171 has flexibility such that the thin film part 171 is deformed in accordance with motion of the valve unit 160 along the axis X1.

The spring (metal member) 180 is a member made of metal (for example, made of stainless) that generates pushing force directed to move the valve unit 160 away from the valve hole 113*a* along the axis X1 of the valve unit 160. The lower end of the spring 180 is arranged in contact with the upper housing 120, and the upper end of the spring 180 is arranged in contact with a piston 185. The lower end of the piston 185 is connected to the upper end of the valve unit 160. Thus, the pushing force generated by the spring 180 is transferred to the upper end of the valve unit 160 via the piston 185.

The static charge eliminating unit 190 is a member formed annularly about the axis X1 and arranged interposed between the body 110 and the base part 172 of the diaphragm unit 170 in the direction along the axis X1. The static charge eliminating unit 190 is formed of an electroconductive fluororesin material containing a fluororesin material and an electroconductive material dispersed in the fluororesin material. The static charge eliminating unit 190 has an exposed part 191 exposed to the valve chamber 114 and forming a part of the inner circumferential face of the valve chamber 114.

Figure 3:
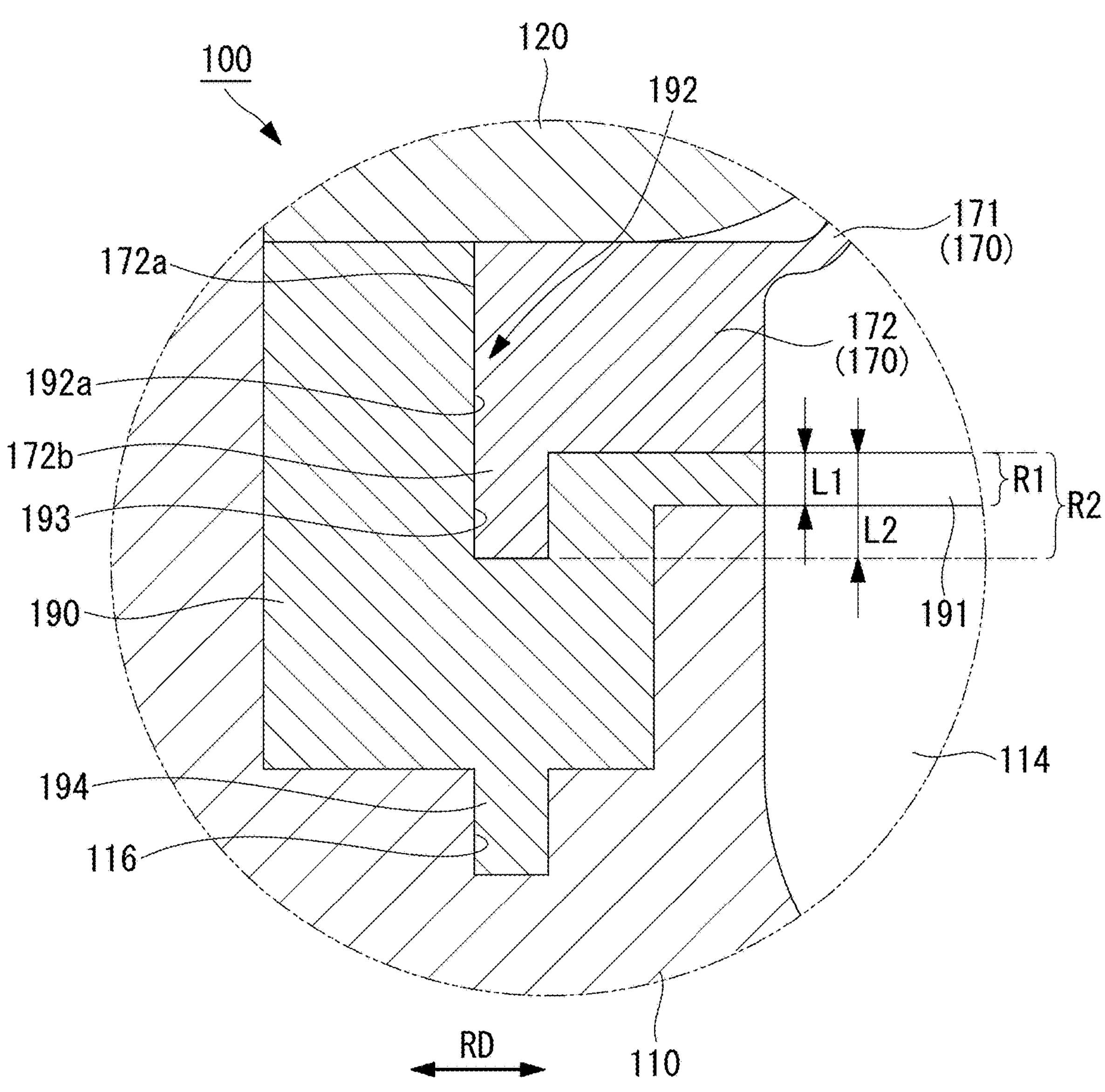
FIG. 3 is a partial enlarged view of a part B of the isolation valve illustrated in FIG. 2.

FIG. 3 is a partial enlarged view of the part B of the isolation valve 100 illustrated in FIG. 2. As illustrated in FIG. 3, the static charge eliminating unit 190 has an accommodation part 192 that accommodates the base part 172 on the inner circumferential side in the radial direction RD orthogonal to the direction along the axis X1. The base part 172 and the static charge eliminating unit 190 are arranged with the outer circumferential face 172*a* of the base part 172 and the inner circumferential face 192*a* of the accommodation part 192 being in contact with each other.

A first annular protrusion 172*b* protruding toward the static charge eliminating unit 190 and formed annularly about the axis X1 is formed on the outer edge in the radial direction RD of the base part 172. A first annular groove 193 formed annularly about the axis X1 is formed in a region facing the first annular protrusion 172*b* of the static charge eliminating unit 190.

The base part 172 and the static charge eliminating unit 190 are arranged with the first annular protrusion 172*b* being inserted in the first annular groove 193. The first annular protrusion 172*b* and the first annular groove 193 are in contact with each other, and thereby a seal region is formed to the entire circumference about the axis X1. This seal region can reliably prevent a fluid from flowing out from between the static charge eliminating unit 190 and the diaphragm unit 170.

A second annular protrusion 194 protruding toward the body 110 and formed annularly about the axis X1 is formed to the static charge eliminating unit 190. A second annular groove 116 formed annularly about the axis X1 is formed in a region facing the second annular protrusion 194 of the body 110.

The static charge eliminating unit 190 and the body 110 are arranged with the second annular protrusion 194 being inserted in the second annular groove 116. The second annular protrusion 194 and the second annular groove 116 are in contact with each other, and thereby a seal region is formed to the entire circumference about the axis X1. This seal region can reliably prevent a fluid from flowing out from between the static charge eliminating unit 190 and the body 110.

As illustrated in FIG. 3, the first annular protrusion 172*b*, the first annular groove 193, the second annular protrusion 194, and the second annular groove 116 are arranged at the same position in the radial direction RD. Since the load applied from the first annular protrusion 172*b* to the first annular groove 193 is transferred from the second annular protrusion 194 to the second annular groove 116, the seal property of the seal region formed by the second annular protrusion 194 and the second annular groove 116 can be improved.

The exposed part 191 is exposed to the valve chamber 114 in a predetermined region R1 in the direction along the axis X1. The predetermined region R1 is a region included in a seal region R2 in which the first annular protrusion 172*b* and the first annular groove 193 are arranged in the direction along the axis X1. The length L1 of the predetermined region R1 in the direction along the axis X1 is shorter than the length L2 of the seal region R2 in the direction along the axis X1. For example, the length L1 is preferably set to 0.1 mm or greater and 2.0 mm or less.

Figure 4:
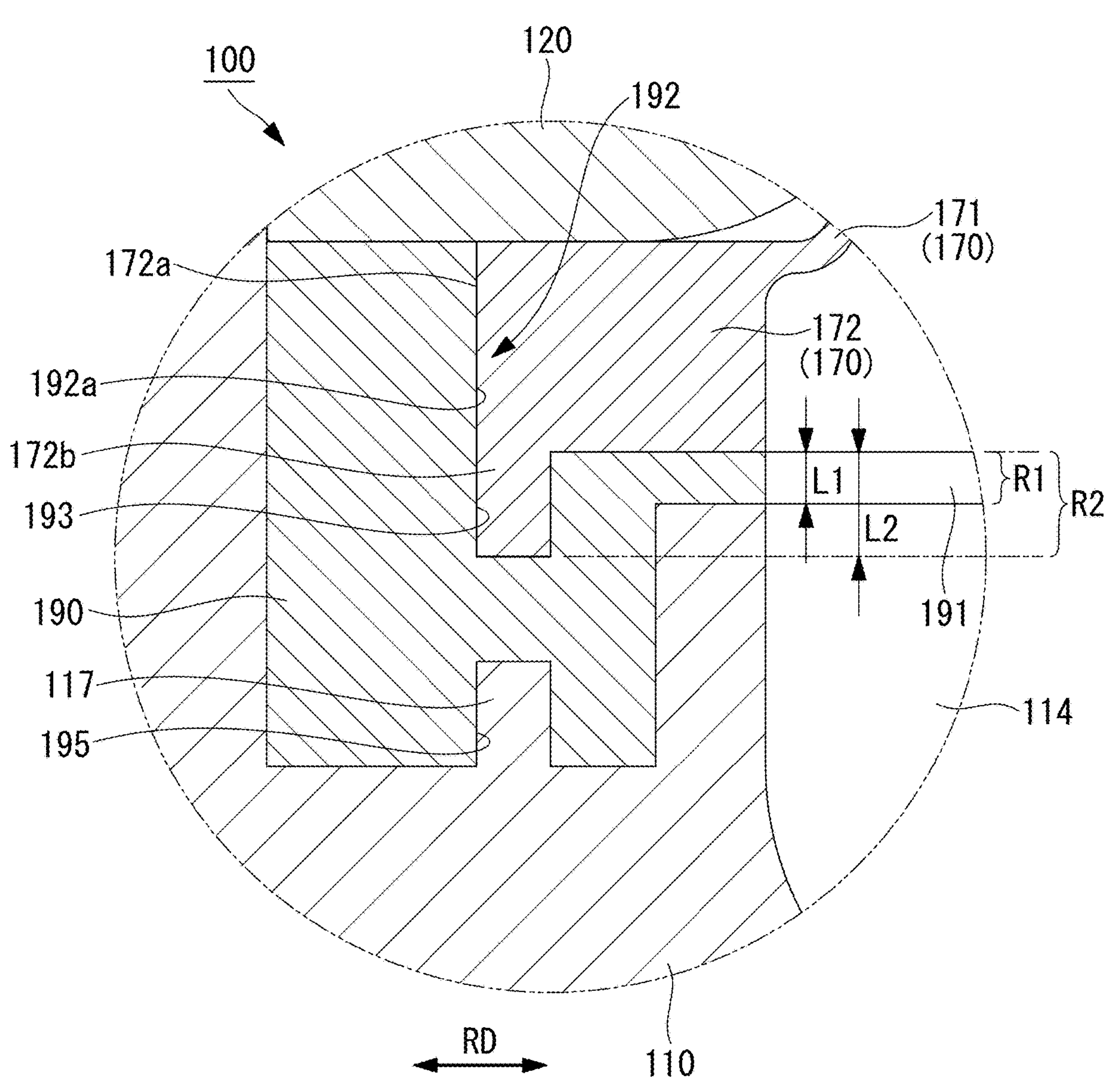
FIG. 4 is a partial enlarged view illustrating a modified example of the isolation valve.

Although the isolation valve 100 illustrated in FIG. 3 has the second annular protrusion 194 formed to the static charge eliminating unit 190 and the second annular groove 116 formed in the body 110, other forms may be employed. For example, a modified example illustrated in FIG. 4 may be employed. FIG. 4 is a partial enlarged view illustrating a modified example of the isolation valve 100.

In the isolation valve 100 illustrated in FIG. 4, a second annular protrusion 117 protruding toward the static charge eliminating unit 190 and formed annularly about the axis X1 is formed to the body 110. A second annular groove 195 formed annularly about the axis X1 is formed in a region facing the second annular protrusion 117 of the static charge eliminating unit 190.

The static charge eliminating unit 190 and the body 110 are arranged with the second annular protrusion 117 being inserted in the second annular groove 195. The second annular protrusion 117 and the second annular groove 195 are in contact with each other, and thereby a seal region is formed to the entire circumference about the axis X1. This seal region can reliably prevent a fluid from flowing out from between the static charge eliminating unit 190 and the body 110.

As illustrated in FIG. 4, the first annular protrusion 172*b*, the first annular groove 193, the second annular protrusion 117, and the second annular groove 195 are arranged at the same position in the radial direction RD. Since the load applied from the first annular protrusion 172*b* to the first annular groove 193 is transferred from the second annular groove 195 to the second annular protrusion 117, the seal property of the seal region formed by the second annular protrusion 117 and the second annular groove 195 can be improved.

In the isolation valve 100 of the present embodiment, the body 110, the upper housing 120, the lower housing 130, the valve unit 160, and the diaphragm unit 170 are formed of a fluororesin material containing no electroconductive material. On the other hand, in the isolation valve 100 of the present embodiment, the static charge eliminating unit 190 is formed of a fluororesin material containing an electroconductive material.

Examples of the fluororesin material used herein include PTFE (polytetrafluoroethylene), PCTFE (polychlorotrifluoroethylene), and PFA (tetrafluoroethylene-perfluoroalkyl vinyl ether copolymer). As the fluororesin material, powder-like material (for example, PTFE G163 manufactured by ASAHI GLASS CO., LTD.) can be used.

As the electroconductive material, carbon nanotubes can be used. Carbon nanotubes having, for example, the following characteristics are desirably used.

having a fiber length in a range from 50 μm or more and 150 μm or less.

having a fiber diameter in a range from 5 nm or more and 20 nm or less.

having a bulk density in a range from 10 $mg/cm^3$ or more and 70 $mg/cm^3$ or less.

having a G/D ratio in a range from 0.7 or more and 2.0 or less.

having purity of 99.5% or more.

formed of multiple layers (for example, 4 to 12 layers).

In this case, the reason why the fiber length of carbon nanotubes is set to 50 μm or more is that when the carbon nanotubes are dispersed in the fluororesin material, only a small number of carbon nanotubes are needed to impart a sufficient conductivity.

The G/D ratio is a value indicating a ratio of G-band peaks and D-band peaks which appear in a Raman spectrum of the carbon nanotubes. The G-band is derived from a graphite structure, and the D-band is derived from a defect. The G/D ratio indicates a ratio of purity of crystal to a defect concentration in the carbon nanotubes.

Figure 5:
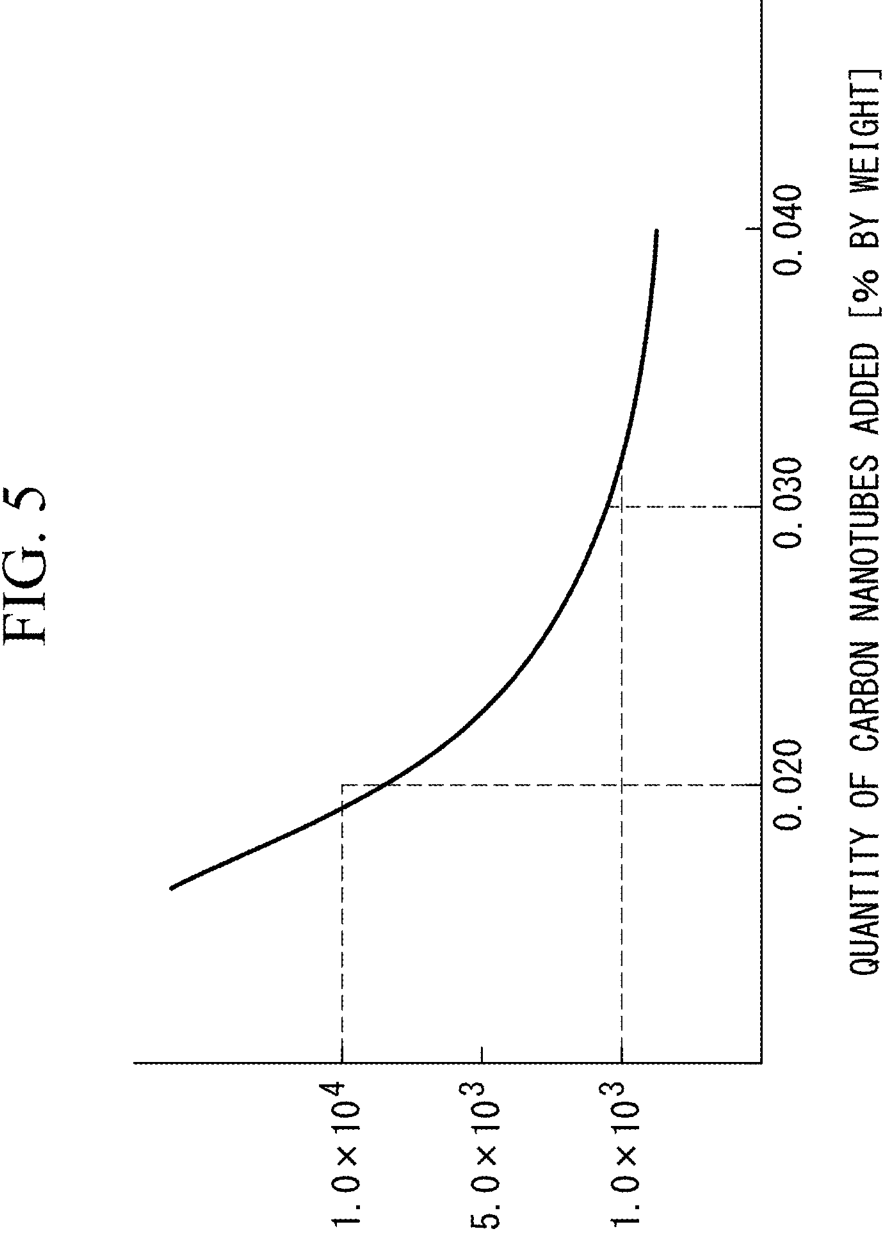
FIG. 5 is a graph illustrating a relationship between the quantity of carbon nanotubes added and the volume resistivity of an electroconductive fluororesin material.

The inventors have studied about the relationship between the additive amount (weight %) of carbon nanotubes dispersed in the fluororesin material and the volume resistivity (Ω·cm) of the conductive fluororesin material including the fluororesin material and the carbon nanotubes dispersed in the fluororesin material, and have obtained the results as shown in FIG. 5. FIG. 5 shows the results of measurement of the volume resistivity of test pieces on the basis of "testing method for resistivity of conductive plastics with a four-point probe array" defined in JIS K 7194.

Multiple test pieces were prepared by performing melt-kneading using a kneader and then performing compression molding using a compression molding machine to thereby process the test pieces into a size compliant with JIS K 7194. PTFE G163 manufactured by ASAHI GLASS CO., LTD. was used as the fluororesin material for creating the test pieces. For measurement of the volume resistivity, a resistivity meter using a 4-point probe method compliant with JIS K 7194 was used. The 4-point probe method is a method in which four needle-like probes (electrodes) are brought into contact with the test pieces and the resistance of each test piece is obtained based on a current caused to flow between two outside probes and a potential difference generated between two inside probes. The volume resistivity was calculated by averaging the measurement values obtained at multiple positions from the multiple test pieces.

According to the results shown in FIG. 5, the additive amount of carbon nanotubes was set in a range from 0.020 weight % or more and 0.030 weight % or less, so that the volume resistivity of the conductive fluororesin material was larger than $1.0\times10^3$ Ω·cm and less than $1.0\times10^4$ Ω·cm. This volume resistivity value is sufficiently smaller than the value ($10^{18}$ Ω·cm) of the volume resistivity of the fluororesin material in which carbon nanotubes are not dispersed.

The present inventors measured the charged voltage generated in the valve chamber 114 in a state where an air of 50 kPa is circulated in the inflow-side channel 113, the valve chamber 114, and the outflow-side channel 115 by using the isolation valve 100 in which the static charge eliminating unit 190 formed of a conductive fluororesin material containing carbon nanotubes at an additive amount of 0.025 weight %. The measurement result shows that the charged voltage generated at the valve chamber 114 is maintained at the about 0.2 kV.

On the other hand, the present inventors measured the charged voltage generated at the valve chamber 114 in a state where air of 50 kPa is circulated through the inflow-side channel 113, the valve chamber 114, and the outflow-side channel 115 by using a flow rate adjustment device of Comparative Example in which the static charge eliminating unit 190 is made of a fluororesin material with no carbon nanotubes are formed. The measurement result shows that the charged voltage generated at the valve chamber 114 is maintained at about 3.0 kV or more.

From the above results, in the first embodiment, the conductive fluororesin material forming the static charge eliminating unit 190 contains carbon nanotubes at a ratio of 0.020 weight % or more and 0.030 weight % or less. The static charge eliminating unit 190 is connected to the ground cable 10 via the electrical conduction part 140. As a result, the volume resistivity of the conductive fluororesin material is larger than $1.0\times10^3$ Ω·cm and less than $1.0\times10^4$ Ω·cm, and the charged voltage generated at the valve chamber 114 can be maintained at a small value of about 0.2 kV.

The effects and advantages achieved by the isolation valve 100 of the present embodiment described above will be described.

According to the isolation valve 100 of the present embodiment, the static charge eliminating unit 190 formed of an electroconductive fluororesin material is arranged interposed between the body 110, inside which the inflow-side channel 113, the valve chamber 114, and the outflow-side channel 115 are formed, and the base part 172 of the diaphragm unit 170 connected to the outer circumferential face of the valve unit 160. Positive electrical charge generated in a fluid due to friction between the diaphragm unit 170 and a fluid is eliminated through the exposed part 191 of the static charge eliminating unit 190 maintained at the ground potential by the electrical conduction part 140, and accordingly, negative electrical charge in the diaphragm unit 170 is eliminated. It is thus possible to suppress a malfunction that the thin-film diaphragm unit 170 reaches a dielectric breakdown and a fluid flowing through the valve chamber 114 flows out of the diaphragm unit 170. Further, compared to a case where the diaphragm unit 170 and the valve unit 160 are entirely formed of an electroconductive fluororesin material, the contact area between the electroconductive fluororesin material and a fluid can be reduced, and contamination of the fluid due to dissolution of metal ions from the electroconductive fluororesin material can be prevented.

According to the isolation valve 100 of the present embodiment, since the outer circumferential face 172*a* of the base part 172 and the inner circumferential face 192*a* of the accommodation part 192 are arranged in contact with each other, a change in the position in the radial direction RD of the base part 172 can be reliably prevented that would otherwise be caused by the base part 172 moving outward in the radial direction RD.

According to the isolation valve 100 of the present embodiment, the first annular protrusion 172*b* formed on the outer edge in the radial direction RD of the base part 172 is arranged inserted in the first annular groove 193 formed in the static charge eliminating unit 190, and the seal region R2 is formed to the entire circumference about the axis X1. This seal region R2 makes it possible to reliably prevent a fluid from flowing out from between the base part 172 and the static charge eliminating unit 190.

According to the isolation valve 100 of the present embodiment, the exposed part 191 of the static charge eliminating unit 190 is exposed to the valve chamber 114 in the predetermined region R1 included in the seal region R2 in which the first annular protrusion 172*b* and the first annular groove 193 are arranged in the direction along the axis X1. Since the exposed part 191 is present near the thin film part 171 of the diaphragm unit 170, charges on the thin film part 171 and a fluid, which is positively charged due to friction with the thin film part 171, can be reliably eliminated.

According to the isolation valve 100 of the present embodiment, because the length L1 of the predetermined region R1 in the direction along the axis X1 is shorter than the length L2 of the seal region R2, the area of the exposed part 191 can be reduced, and contamination of the fluid can be prevented that would otherwise be caused by dissolution of metal ions from the electroconductive fluororesin material.

According to the isolation valve 100 of the present embodiment, the second annular protrusion 194 formed to the static charge eliminating unit 190 is arranged inserted in the second annular groove 116 formed in the body 110, and a seal region is formed to the entire circumference about the axis X1. This seal region makes it possible to reliably prevent a fluid from flowing out from between the static charge eliminating unit 190 and the body 110.

According to the isolation valve 100 of the present embodiment, since a load applied from the first annular protrusion 172*b* to the first annular groove 193 is transferred from the second annular protrusion 194 to the second annular groove 116, the seal property of the seal region formed by the second annular protrusion 194 and the second annular groove 116 can be improved.

According to the isolation valve 100 of the modified example for the present embodiment, the second annular protrusion 117 formed to the body 110 is arranged inserted in the second annular groove 195 formed in the static charge eliminating unit 190, and a seal region is formed to the entire circumference about the axis X1. This seal region makes it possible to reliably prevent a fluid from flowing out from between the static charge eliminating unit 190 and the body 110.

According to the isolation valve 100 of the modified example for the present embodiment, since a load applied from the first annular protrusion 172*b* to the first annular groove 193 is transferred from the second annular groove 195 to the second annular protrusion 117, the seal property of the seal region formed by the second annular protrusion 117 and the second annular groove 195 can be improved.

Second Embodiment

Next, an isolation valve 100A according to a second embodiment of the present disclosure will be described with reference to the drawings. Since the present embodiment is a modified example from the first embodiment, some description thereof will be omitted below as being the same as the isolation valve 100 of the first embodiment except as specifically described below.

The electrical conduction part 140 of the isolation valve 100 of the first embodiment is a member made of metal arranged interposed between the body 110 and the upper housing 120 in the direction along the axis X1. In contrast, an electrical conduction part 140A of the isolation valve 100A of the present embodiment is an electrical wire having a conductor 141 and an insulator 142.

Figure 6:
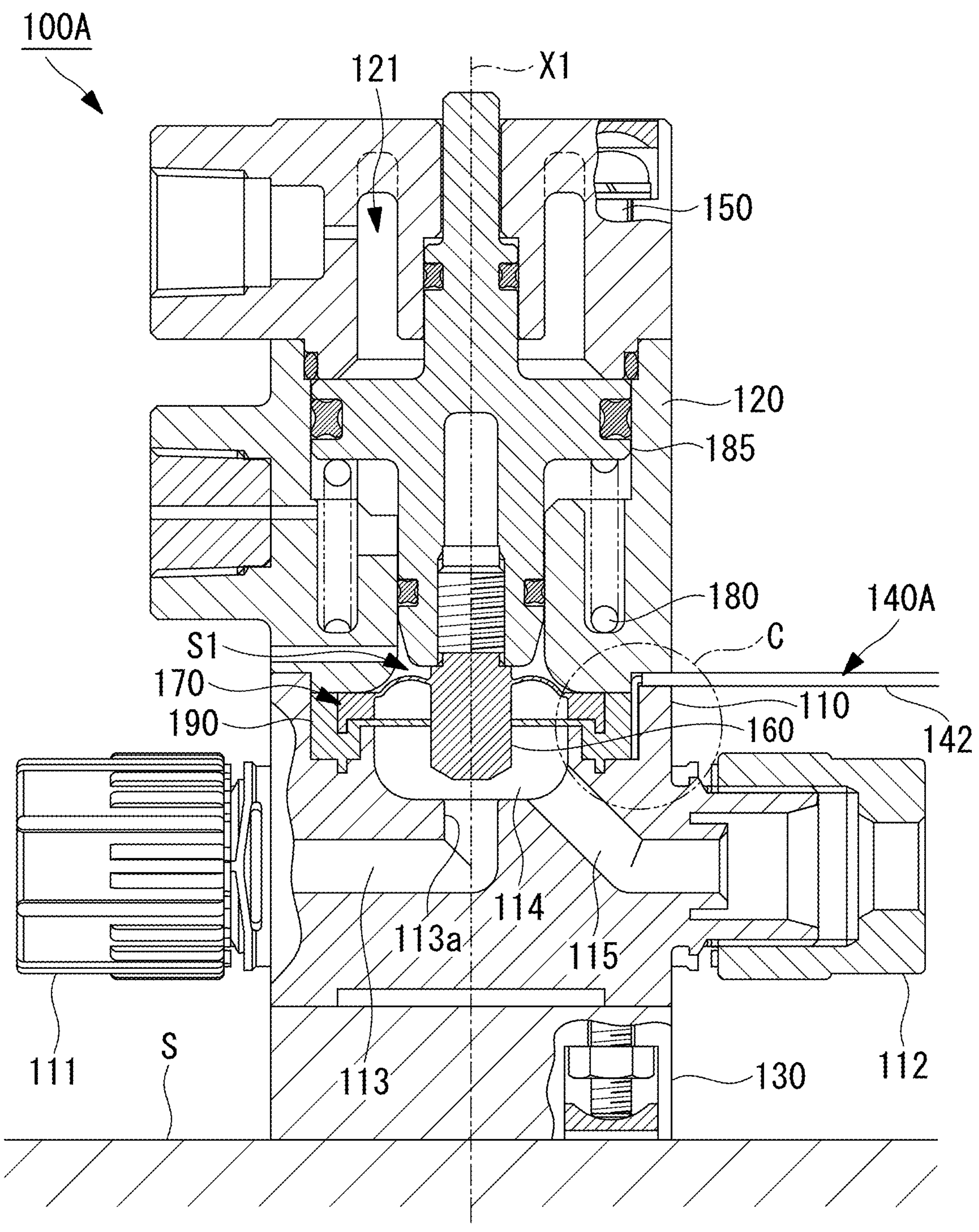
FIG. 6 is a longitudinal sectional view illustrating an isolation valve according to a second embodiment of the present disclosure.
Figure 7:
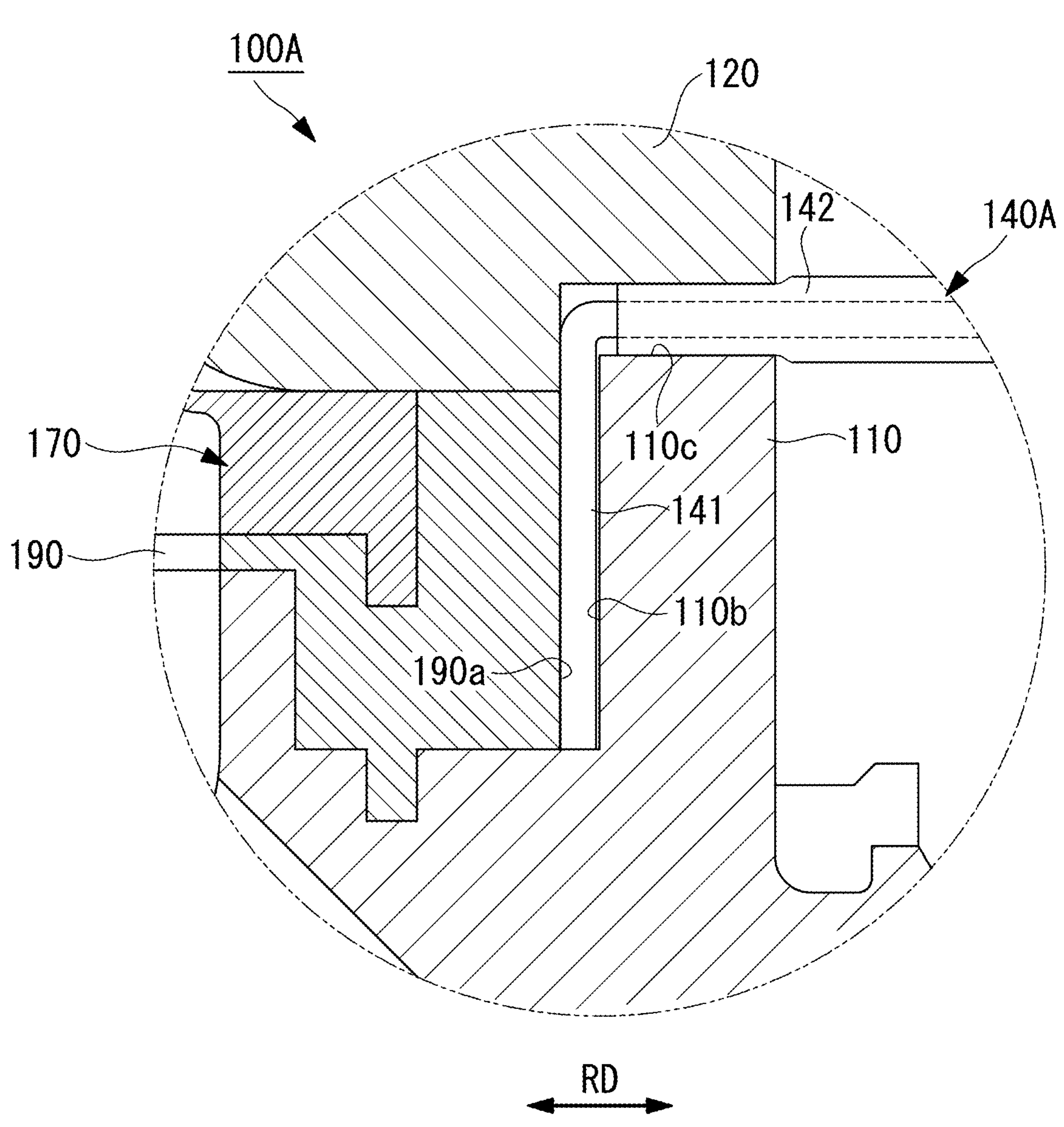
FIG. 7 is a partial enlarged view of a part C of the isolation valve illustrated in FIG. 6.

As illustrated in FIG. 6, the isolation valve 100A of the present embodiment has the electrical conduction part 140A contacted with the static charge eliminating unit 190 and maintained at the ground potential. In the electrical conduction part 140A, the insulator 142 is arranged interposed between the body 110 and the upper housing 120. As illustrated in FIG. 7, the electrical conduction part 140A is an electrical wire having the conductor 141 made of metal (for example, made of copper) maintained at the ground potential and formed in a line shape and the insulator 142 formed of an insulating material (for example, a resin material) covering the conductor 141.

Figure 8:
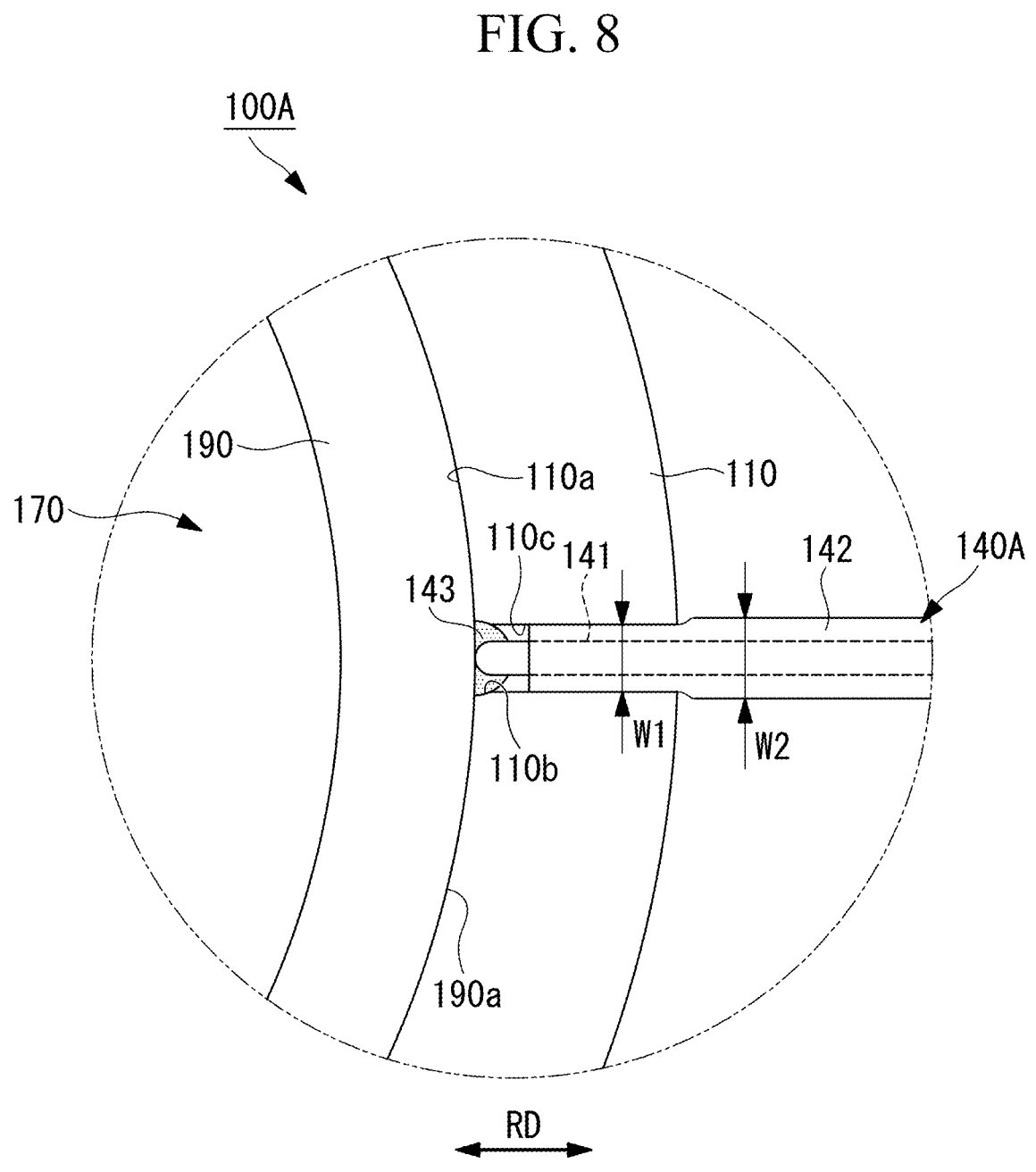

As illustrated in FIG. 8, an accommodation face 110*a* formed annularly about the axis X1 is formed to the body 110 in contact with the outer circumferential face 190*a* of the static charge eliminating unit 190. As illustrated in FIG. 7, a groove 110*b* extending along the axis X1 is formed in the accommodation face 110*a*. The conductor 141 exposed at the tip of the electrical conduction part 140A is accommodated in the groove 110*b* in electrical conduction with the static charge eliminating unit 190.

As illustrated in FIG. 8, the conductor 141 exposed at the tip of the electrical conduction part 140A is fixed to the groove 110*b* by an adhesive agent 143 containing an electroconductive material (for example, silver electroconductive particles). The adhesive agent 143 is injected into the groove 110*b* by an operator in a state where the tip of the electrical conduction part 140A at which the insulator 142 is removed and the conductor 141 is exposed is accommodated in the groove 110*b*.

As illustrated in FIG. 7 and FIG. 8, the accommodation groove 110*c* extending in the radial direction RD is formed in the top face of the body 110. The width W1 of the accommodation groove 110*c* is formed narrower than the width W2 of the electrical conduction part 140A in a natural state. Therefore, by pushing the electrical conduction part 140A into the accommodation groove 110*c*, it is possible to maintain a state where the electrical conduction part 140A is accommodated in the accommodation groove 110*c*.

According to the isolation valve 100A of the present embodiment, an electrical wire having the conductor 141 and the insulator 142 covering the conductor 141 is formed as the electrical conduction part 140A, the conductor 141 exposed at the tip of the electrical conduction part 140A is accommodated in the groove 110*b* formed in the accommodation face 110*a* of the body 110, and thereby the static charge eliminating unit 190 can be maintained at the ground potential with a relatively simple manner.

Further, according to the isolation valve 100A of the present embodiment, the adhesive agent 143 containing an electroconductive material is injected into and solidified in the groove 110*b* in a state where the conductor 141 exposed at the tip of the electrical conduction part 140A is accommodated in the groove 110*b*, and thereby the conductor 141 can be reliably fixed to the groove 110*b* while the conductor 141 is maintained in electrical connection to the static charge eliminating unit 190.

Other Embodiments

Although the isolation valve 100 has been described as the fluid device in the above description, other fluid devices may be employed. For example, other fluid devices such as a flow rate adjusting device that adjusts the length of insertion of a needle valve into a valve hole to adjust the flow rate of a fluid may be employed.

What is claimed is:

1. A fluid device comprising:

a valve unit formed axially extending along an axis and configured to be movable along the axis;

a body having a valve hole and a fluid channel formed inside the body, the valve unit moving closer to or away from the valve hole, and a fluid being allowed to flow through the fluid channel;

a diaphragm unit having a thin film part and a base part, the thin film part being connected to an outer circumferential face of the valve unit and formed annularly about the axis so as to isolate a valve chamber from an adjacent space adjacent to the valve chamber, the valve unit being arranged in the valve chamber, and the base part being connected on an outer circumferential side of the thin film part and formed annularly about the axis;

a static charge eliminating unit formed annularly about the axis and arranged interposed between the body and the base part in a direction along the axis; and an electrical conduction part being in contact with the static charge eliminating unit and being maintained at a ground potential, wherein the static charge eliminating unit has an exposed part formed of an electroconductive fluororesin material and exposed to the valve chamber, the electroconductive fluororesin material containing a fluororesin material and an electroconductive material dispersed in the fluororesin material.

2. The fluid device according to claim 1, wherein the static charge eliminating unit has an accommodation part configured to accommodate the base part on an inner circumferential side in a radial direction orthogonal to the direction along the axis, and wherein the base part and the static charge eliminating unit are arranged with an outer circumferential face of the base part being in contact with an inner circumferential face of the accommodation part.

3. The fluid device according to claim 2, wherein a first annular protrusion protruding toward the static charge eliminating unit and formed annularly about the axis is formed on an outer edge in the radial direction of the base part, wherein a first annular groove formed annularly about the axis is formed in a region of the static charge eliminating unit, the region facing the first annular protrusion, and wherein the base part and the static charge eliminating unit are arranged with the first annular protrusion being inserted in the first annular groove.

4. The fluid device according to claim 3, wherein the exposed part is exposed to the valve chamber in a predetermined region in the direction along the axis, and wherein the predetermined region is included in a seal region where the first annular protrusion and the first annular groove are arranged in the direction along the axis.

5. The fluid device according to claim 4, wherein a length of the predetermined region in the direction along the axis is shorter than a length of the seal region in the direction along the axis.

6. The fluid device according to claim 3, wherein a second annular protrusion protruding toward the body and formed annularly about the axis is formed to the static charge eliminating unit, wherein a second annular groove formed annularly about the axis is formed in a region of the body, the region facing the second annular protrusion, and wherein the static charge eliminating unit and the body are arranged with the second annular protrusion being inserted in the second annular groove.

7. The fluid device according to claim 6, wherein the first annular protrusion, the first annular groove, the second annular protrusion, and the second annular groove are arranged at the same position in the radial direction.

8. The fluid device according to claim 3, wherein a second annular protrusion protruding toward the static charge eliminating unit and formed annularly about the axis is formed to the body, wherein a second annular groove formed annularly about the axis is formed in a region of the static charge eliminating unit, the region facing the second annular protrusion, and wherein the body and the static charge eliminating unit are arranged with the second annular protrusion being inserted in the second annular groove.

9. The fluid device according to claim 8, wherein the first annular protrusion, the first annular groove, the second annular protrusion, and the second annular groove are arranged at the same position in the radial direction.

10. The fluid device according to claim 1, wherein the electrical conduction part is an electrical wire having a metal conductor and an insulator covering the conductor, the conductor being maintained at a ground potential and formed in a line shape, wherein an accommodation face arranged annularly about the axis in contact with an outer circumferential face of the static charge eliminating unit is formed in the body, wherein a groove extending along the axis is formed in the accommodation face, and wherein the conductor exposed at a tip of the electrical conduction part is accommodated in the groove in electrical conduction with the static charge eliminating unit.

11. The fluid device according to claim 10, wherein the conductor exposed at the tip of the electrical conduction part is fixed to the groove by an adhesive agent containing an electroconductive material.

* * * * *